(12) United States Patent
Galbreth et al.

(10) Patent No.: US 11,885,728 B2
(45) Date of Patent: Jan. 30, 2024

(54) MASS MEASUREMENT SYSTEMS AND RELATED METHODS FOR MEASURING MASS OF SOLIDS WITHIN A LIQUID

(71) Applicant: Battelle Energy Alliance, LLC, Idaho Falls, ID (US)

(72) Inventors: Gregory G. Galbreth, Idaho Falls, ID (US); Ammon N. Williams, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 17/644,438

(22) Filed: Dec. 15, 2021

(65) Prior Publication Data
US 2022/0196536 A1    Jun. 23, 2022

Related U.S. Application Data

(60) Provisional application No. 63/129,844, filed on Dec. 23, 2020.

(51) Int. Cl.
*G01N 15/06* (2006.01)
*G01L 1/16* (2006.01)

(52) U.S. Cl.
CPC ............. *G01N 15/06* (2013.01); *G01L 1/16* (2013.01)

(58) Field of Classification Search
CPC .... G01F 23/168; G01F 23/167; G01F 23/162; G01F 23/161; G01F 23/14; G01N 9/266; G01N 9/26; G01N 9/28
See application file for complete search history.

(56) References Cited

U.S. PATENT DOCUMENTS

| | | | | | |
|---|---|---|---|---|---|
| 2,668,438 A | * | 2/1954 | Marquardt | ............... | G01N 9/28 73/302 |
| 3,473,379 A | * | 10/1969 | Powell, Jr. | .............. | G01F 23/14 73/301 |
| 4,043,193 A | * | 8/1977 | Bailey | ...................... | G01N 9/26 73/302 |
| 4,140,007 A | | 2/1979 | Bosland et al. | | |
| 4,145,817 A | * | 3/1979 | Ager | ........................ | G01C 5/04 33/367 |
| 4,393,451 A | * | 7/1983 | Barker | .................... | G01F 1/002 702/47 |

(Continued)

FOREIGN PATENT DOCUMENTS

GB     0948125 A     1/1964

*Primary Examiner* — Tran M. Tran
(74) *Attorney, Agent, or Firm* — TraskBritt

(57) ABSTRACT

A measurement system includes a vessel for containing a fluid and at least one solid material and a probe assembly for disposing partially into the fluid within the vessel. The probe assembly includes a hollow tube having an open lower longitudinal end and at least one pressure sensor within the hollow tube, the at least one pressure sensor configured to measure pressures of the fluid within the hollow tube at at least two different elevations. A method of measuring a mass of suspended solids within a fluid, the method includes receiving pressure measurements representing two different elevations of the fluid within a hollow tube and substantially free of the suspended solids and based at least partially on the received pressure measurements, determining a mass of the suspended solids.

19 Claims, 9 Drawing Sheets

(56) References Cited

U.S. PATENT DOCUMENTS

| | | | | |
|---|---|---|---|---|
| 4,393,705 | A | * | 7/1983 | Eidschun .................. G01N 9/28 73/299 |
| 4,476,715 | A | * | 10/1984 | Murphy .................. E21B 21/08 73/152.49 |
| 4,485,675 | A | * | 12/1984 | Verret ...................... G01N 9/28 73/439 |
| 4,630,478 | A | * | 12/1986 | Johnson .................. G01F 23/14 73/299 |
| 4,669,309 | A | * | 6/1987 | Cornelius ............... G01F 23/14 73/302 |
| 4,708,018 | A | * | 11/1987 | Brown .................... G01N 9/28 73/439 |
| 5,005,408 | A | * | 4/1991 | Glassey .................. G01N 9/28 73/299 |
| 5,146,783 | A | * | 9/1992 | Jansche ................ G01F 23/168 73/302 |
| 5,587,527 | A | * | 12/1996 | Radford .................. G01N 9/28 73/439 |
| 5,636,547 | A | * | 6/1997 | Raj ...................... G01L 9/0094 73/299 |
| 5,661,228 | A | * | 8/1997 | Young ...................... G01F 23/16 73/299 |
| 5,953,954 | A | * | 9/1999 | Drain .................... G01F 23/168 73/302 |
| 6,301,546 | B1 | * | 10/2001 | Weinstein ............... B01J 8/1809 702/23 |
| 6,546,956 | B1 | * | 4/2003 | Lai ...................... G01F 23/0046 137/558 |
| 6,601,449 | B1 | * | 8/2003 | Jones .................... G01F 23/167 73/302 |
| 6,668,625 | B2 | * | 12/2003 | Weis ...................... G01F 23/14 73/61.78 |
| 6,763,714 | B2 | * | 7/2004 | Molina ................ G01F 23/168 73/302 |
| 6,776,038 | B1 | * | 8/2004 | Horton .................... G01F 23/14 73/299 |
| 6,799,457 | B2 | * | 10/2004 | Bouchard ............. G01F 23/168 73/290 R |
| 6,907,780 | B1 | * | 6/2005 | Meagher ................. G01F 23/18 73/299 |
| 6,931,925 | B2 | * | 8/2005 | Huemer .................. G01F 25/17 73/299 |
| 6,931,926 | B1 | * | 8/2005 | Van Ee .................... G01N 9/28 73/299 |
| 7,032,449 | B2 | * | 4/2006 | Rivas P. .................. G01N 9/26 73/299 |
| 7,389,688 | B1 | * | 6/2008 | Vander Horst ........ G01F 23/242 73/299 |
| 7,669,473 | B2 | * | 3/2010 | Hedrick ................ G01F 23/168 73/299 |
| 7,895,890 | B2 | * | 3/2011 | Van Ee .................. G01F 23/165 73/61.41 |
| 8,464,590 | B2 | * | 6/2013 | Waldrop ............... G01F 23/802 73/1.72 |
| 8,479,572 | B2 | * | 7/2013 | Onishi ...................... B01J 8/226 73/299 |
| 8,521,452 | B2 | * | 8/2013 | Smaidris ................. G01F 23/14 702/50 |
| 8,756,991 | B2 | * | 6/2014 | Edwards ............... G01F 23/165 73/290 R |
| 8,794,061 | B1 | * | 8/2014 | Sickels, Jr. ............. E21B 44/00 73/152.05 |
| 9,513,155 | B2 | * | 12/2016 | Harper .................... G01F 23/26 |
| 9,671,722 | B2 | * | 6/2017 | Leynen .................... G01N 9/26 |
| 9,939,305 | B2 | * | 4/2018 | Tetil ........................ G01F 23/14 |
| 10,139,262 | B2 | * | 11/2018 | Keller ...................... G01F 23/14 |
| 10,627,280 | B2 | * | 4/2020 | Zakrzewski .......... G01F 23/804 |
| 10,746,007 | B2 | * | 8/2020 | Gettis ................ B01D 19/0042 |
| 10,852,174 | B2 | * | 12/2020 | Lutz ........................ G01F 23/18 |
| 10,876,878 | B2 | * | 12/2020 | Kulczyk ................ G01F 23/18 |
| 11,215,544 | B2 | * | 1/2022 | Mullins .................. E21B 47/04 |
| 11,340,150 | B2 | * | 5/2022 | Maldonado Saavedra .................. G01N 9/002 |
| 11,519,772 | B2 | | 12/2022 | Krammer ............. G01F 23/167 |
| 2004/0020288 | A1 | * | 2/2004 | Tsukamoto ........... B41F 31/022 73/298 |
| 2005/0189275 | A1 | * | 9/2005 | Stewart .................... C02F 1/008 210/90 |
| 2009/0056437 | A1 | * | 3/2009 | Kawanishi ............. G01F 23/14 73/295 |
| 2012/0067133 | A1 | * | 3/2012 | Waldrop ................. G01F 23/14 73/753 |
| 2012/0325022 | A1 | * | 12/2012 | Shanebrook ........... G01F 23/16 73/862.581 |
| 2015/0096369 | A1 | * | 4/2015 | Sickels, Jr. ............. G01N 9/26 73/438 |
| 2015/0096804 | A1 | * | 4/2015 | Sickels, Jr. ............. E21B 44/00 175/40 |
| 2017/0097295 | A1 | * | 4/2017 | Verbanck ................ G01F 15/02 |
| 2019/0185806 | A1 | * | 6/2019 | Patrício Domingues Gonçalves .. G01N 9/26 |
| 2020/0064175 | A1 | * | 2/2020 | Krammer ............. G01F 23/168 |
| 2020/0200665 | A1 | * | 6/2020 | Tinker ...................... C09K 8/80 |
| 2021/0356310 | A1 | * | 11/2021 | Sosnowski ........... B29C 64/386 |

* cited by examiner

US 11,885,728 B2

MASS MEASUREMENT SYSTEMS AND RELATED METHODS FOR MEASURING MASS OF SOLIDS WITHIN A LIQUID

CROSS-REFERENCE TO RELATED APPLICATIONS

This application claims the benefit under 35 U.S.C. § 119(e) of U.S. Provisional Patent Application Ser. No. 63/129,844, filed Dec. 23, 2020, the disclosure of which is hereby incorporated in its entirety herein by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

This disclosure relates generally to mass measurement systems for determining masses of solids suspended within fluids. The disclosure further relates to methods for determining masses of solids suspended within fluids.

BACKGROUND

Fluids having suspended solids (e.g., slurries) are utilized in various applications, such as, for example, wastewater treatments, water treatment, mineral processing, and material accounting. Measuring and knowing a mass of the solids suspended within the fluid (e.g., a mass of solids within a slurry) would be useful. For example, carbon and/or resin are often utilized as fluidized beds to absorb impurities or precious metals. In operation, the absorption materials (i.e., the carbon and/or resin) are periodically removed and replaced. Monitoring and knowing the amount of suspended solid materials can inform future processing parameters and improve efficiency.

BRIEF DESCRIPTION OF THE DRAWINGS

For a detailed understanding of the disclosure, reference should be made to the following detailed description, taken in conjunction with the accompanying drawings, in which like elements have generally been designated with like numerals, and wherein.

DETAILED DESCRIPTION

Figure 1:
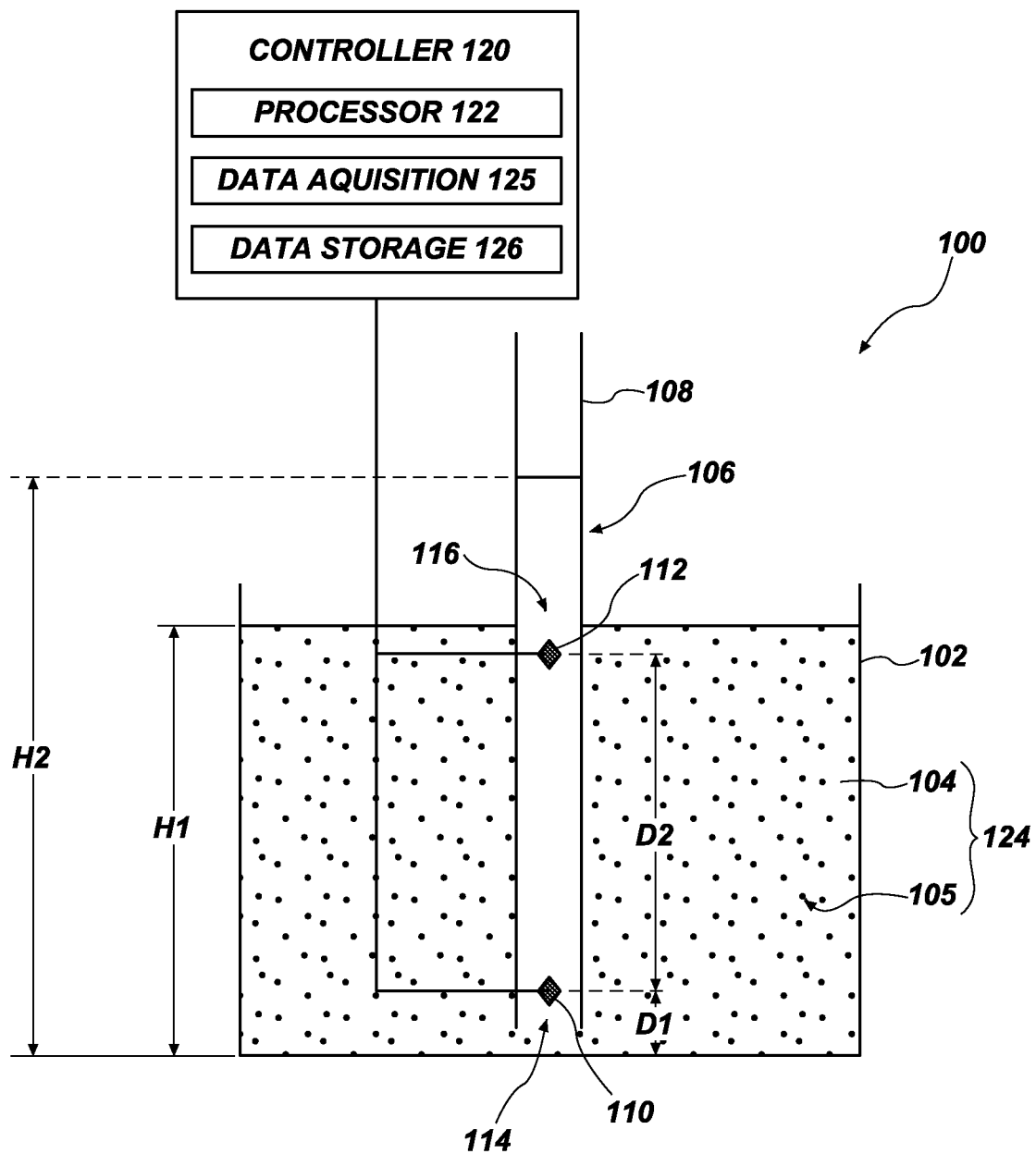
FIG. 1 illustrates a schematic diagram of a measurement system according to one or more embodiments of the disclosure.

The illustrations presented herein are not actual views of any measurement system, probe assembly, or any component thereof, but are merely idealized representations, which are employed to describe embodiments of the present invention.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "third," etc. is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "suspended solids" refers to solid particles (e.g., relatively small solid particles and materials) that are in suspension in a fluid as a colloid or due to motion of the fluid and can be removed via sedimentation due to gravity. Additionally, as used herein, the term "solid material" may refer to one or more solid particles or collections of solid particles. Furthermore, in some embodiments, the solid material may not be soluble within the fluid. In other embodiments, the solid material may be soluble within the fluid, but the suspended solids may refer to a portion of the solids that are not substantially dissolved within the fluid. For example, the suspended solids may refer to the portion of the solids that are in excess to an amount of solids soluble within the fluid.

Embodiments of the disclosure include measurement systems for measuring and determining a mass of solids suspended within a fluid. The measurement system may include a vessel for containing the fluid and at least one solid material and a probe assembly for disposing partially into the fluid within the vessel. The probe assembly may include a hollow tube having an open lower longitudinal end and at least one pressure sensor within the hollow tube, the at least one pressure sensor configured to measure pressures of the fluid within the hollow tube at at least two different elevations.

Embodiments of the disclosure further include measurement systems for measuring and determining a mass of solids suspended within a fluid. The measurement system may include a vessel for containing a slurry mixture of a fluid and at least one solid material and a probe assembly configured to be suspended partially within the slurry mixture. The probe assembly may include a hollow tube having an open lower longitudinal end, a first pressure sensor disposed within the hollow tube and oriented at a first axial location along a longitudinal axis of the hollow tube, and a second pressure sensor disposed within the hollow tube and oriented at a second axial location along the longitudinal axis of the hollow tube. The measurement system may further include a controller operably coupled to the first and second pressure sensor. The controller may include at least one processor and at least one non-transitory computer-readable storage medium storing instructions thereon that, when executed by the at least one processor, cause the controller to: receive pressure data from the first and second pressure sensors; and based on the received pressure data, determine a mass of the at least one solid material within the vessel.

Embodiments of the disclosure also include methods for measuring a mass of suspended solids within a fluid. The method may include receiving pressure measurements representing two different elevations of the fluid within a hollow tube and substantially free of the suspended solids and based at least partially on the received pressure measurements, determining a mass of the suspended solids.

FIG. 1 is a schematic representation of a mass measurement system 100 according to one or more embodiments of the disclosure. The mass measurement system 100 described herein may be utilized to measure (e.g., determine) a mass of suspended solids 105 (i.e., solid materials) within a fluid 104. A mixture (e.g., a two-phase mixture) of the fluid 104 and the suspended solids 105 may be referred to herein as a slurry 124. The mass measurement system 100 may include a vessel 102 and a probe assembly 106.

The vessel 102 may be utilized to hold (e.g., contain) the fluid 104 and the solids 105, and the probe assembly 106 may be configured to be suspended above the vessel 102 and at least partially disposed within the fluid 104 within the vessel 102 from a top surface of the fluid 104. In other words, the probe assembly 106 may be configured to be inserted down into the fluid 104. During operation, the solids 105 may be suspended within the fluid 104 to form the slurry 124 via, for example, an agitator or a fluidized bed, as is described in greater detail below.

The probe assembly 106 may include a hollow tube 108 and a first sensor 110 and a second sensor 112 disposed within the hollow tube 108. The first sensor 110 and the second sensor 112 may be disposed at different axial locations along a longitudinal axis of the hollow tube 108. The hollow tube 108 may include an opening 114 at a lower longitudinal end of the hollow tube 108 intended to be inserted into the fluid 104 within the vessel 102. As a result, during operation, the fluid 104 may enter into an interior 116 of the hollow tube 108 through the lower longitudinal end of the hollow tube 108, and the first sensor 110 and the second sensor 112 may be oriented at differing elevations (e.g., vertical positions). In some embodiments, the hollow tube 108 may be open at both longitudinal ends.

The mass measurement system 100 may further include a controller 120 operably coupled to the first sensor 110 and the second sensor 112 of the probe assembly 106. The controller 120 may include a processor 122, a data acquisition system 125, a data storage device 126 (or a computer-readable medium) for storing data, algorithms, and computer programs. The data storage device 126 may be any suitable device, including, but not limited to, a read-only memory (ROM), a random-access memory (RAM), a flash memory, a magnetic tape, a hard disk, and an optical disc. During operation, the controller 120 may receive (e.g., acquire) data and/or retrieve (e.g., query) data from the first sensor 110 and the second sensor 112. Furthermore, based on the received data, the controller 120 may be at least partially utilized to determine a mass of suspended solids 105 within the fluid 104 (e.g., a mass of the suspended solids 105 of the slurry 124). For example, the controller 120 may include on or more algorithms for determining the mass of the suspended solids 105 within the fluid 104 based at least partially on measurements received from the first and second sensors 110, 112. The controller 120 is described in greater detail below in regard to FIG. 5.

In one or more embodiments, the probe assembly 106 may be oriented in substantially a vertical orientation. In particular, the longitudinal axis of the hollow tube 108 may extend in a substantially vertical direction. Furthermore, the probe assembly 106 may be oriented such that a distance (D1) between a bottom surface of the vessel 102 and a lowermost point (e.g., the lower longitudinal end) of the hollow tube 108 is within a range of between about 0.01 inch and about 5.0 inches. For example, the distance (D1) may be about 0.25 inch. In further embodiments, the probe assembly 106 may be oriented such that a distance (D1) between a bottom surface of the vessel 102 and a lowermost point (e.g., the lower longitudinal end) of the hollow tube 108 is within a range of between about 5.0 inch and about 10.0 inches, between about 10.0 inch and about 20.0 inches, between about 20.0 inch and about 50.0 inches, or between about 50.0 inch and about 200.0 inches.

In some embodiments, as noted above, the first and second sensors 110, 112 may be disposed at different axial locations (e.g., different depths or elevations) within the hollow tube 108. Furthermore, the first and second sensors 110, 112 may be spaced apart from one another by a distance (D2) along the longitudinal axis of the hollow tube 108. The distance D2 may be within a range of between about 1.0 inch and about 20 feet. In one or more embodiments, the distance (D2) is at least about 4.0 inches. For example, the distance (D2) may be at least about 4.0 inches, about 6.0 inches, about 10.0 inches, about 20 inches, about 2.0 feet, about 5.0 feet, about 10 feet, or more. Moreover, the first sensor 110 may be disposed proximate (e.g., within a few inches) of the lower longitudinal end of the hollow tube 108, and the second sensor 112 may be disposed at least about 2.0 inches below a lowest anticipated level of the fluid 104 within the vessel 102.

In one or more embodiments, the first and second sensors 110, 112 may each include a pressure sensor. In some embodiments, each of the first and second sensors 110, 112 may include an electronic pressure transducer. In additional embodiments, each of the first and second sensors 110, 112 may include a bubbler system (e.g., a double or triple bubbler system). For example, each of the first and second sensors 110, 112 may include any conventional bubbler system utilized to measure pressure within a fluid. In further embodiments, each of the first and second sensors 110, 112 may include any conventional pressure sensor or transducer (e.g., a strain gauge, a capacitive sensor, an electromagnetic sensor, a piezoelectric sensor, or an optical sensor). In some embodiments, the first sensor 110 may include a first type of pressure sensor, and the second sensor 112 may include a second, different type of pressure sensor.

During operation and when a slurry 124 is formed by a mixture of the fluid 104 and the solids 105, via, for example agitation, a portion of the fluid 104 within the hollow tube 108 may not be subject to the motion of the fluid 104 within a remainder of the vessel 102. As a result, at least a portion of the solids 105 within the portion of the fluid 104 within the hollow tube 108 may fall out of the portion of the fluid 104 within the hollow tube 108. In other words, the portion of the fluid 104 within the hollow tube 108 may be at least partially isolated from agitation or flow experienced in a remainder of the vessel 102, and as a result, solids 105 may settle out of the portion of the fluid 104 within the hollow tube 108, yielding a substantially solid free fluid 104 within the hollow tube 108.

Furthermore, because the lower longitudinal end of the hollow tube 108 is open to the fluid 104 via the opening 114, the portion of the fluid 104 within the hollow tube 108 may be subject to the static pressure of the fluid 104 within a remainder of the vessel 102, which includes the suspended solids 105 (e.g., the slurry 124). As a result, the fluid 104 within the hollow tube 108 may have a lower density than the slurry 124 and may rise within the hollow tube 108 due to differential densities between the fluid 104 within the hollow tube 108 and the slurry 124 within the remainder of the vessel 102. Furthermore, as is described in greater detail below, the difference in height (H2) between the fluid 104 within the hollow tube 108 and the height (H1) (e.g., slurry height) of the slurry 124 within the vessel 102 and a known or a determined density of the fluid 104 absent the suspended solids 105 may be utilized to calculate a mass of the suspended solids 105 within the slurry 124. In some embodiments, the height (H1) (e.g., slurry height) of the slurry 124 may be known. In other embodiments, as is described in greater detail below, the mass measurement system 100 may further include a level sensor (FIG. 2B) or additional pressure sensor utilized to determine the height (H1) of the slurry 124 within the vessel 102.

In some embodiments, the fluid 104 may include water. In other embodiments, the fluid 104 may include an oil, an alcohol, or a mixture of fluids. In further embodiments, the fluid 104 may include a gas. For example, the fluid 104 may include any conventional fluid utilized in two-phase mixtures with solid materials (e.g., a mixture of two different substances, one being fluid and one being solid). In one or more embodiments, the solids 105 may include a carbon material, a resin material, lime, flue dust, a metal, and/or salts. However, the solids 105 may include any conventional solid utilized in two-phase mixtures with fluids.

An example process of determining a mass of the suspended solids 105 within the slurry 124 within the vessel 102 is provided below.

One of ordinary skill in the art will recognize that a static pressure (P) in a fluid (e.g., fluid 104) is represented by the following Equation (1) where g is the acceleration due to gravity:

$$P = \rho g h \qquad \text{Equation (1)}$$

Furthermore, Equation (2) can be used to find the height (h) of the first and second sensors 110, 112 when the density (ρ) and pressure (P) of the fluid 104 within the hollow tube 108 is known.

$$h = \frac{P}{\rho g} \qquad \text{Equation (2)}$$

Pressure measurements ($P_a$, $P_b$) from the first and second sensors 110, 112 within the hollow tube 108 may be utilized to determine the density (ρ) of the fluid 104 within the hollow tube 108 when the distance (ΔH) between the first and second sensors 110, 112 (e.g., points of measurement) is known by subtracting the two equations, as represented in Equation (3).

$$P_a - P_b = \rho g H_a - \rho g H_b \qquad \text{Equation (3)}$$

As a result, Equation (3) can be rearranged as Equation (4).

$$\rho = \frac{\Delta P}{g \Delta H} \qquad \text{Equation (4)}$$

The density ($\rho_{Slurry}$) of the slurry 124 may be represented by Equation (5).

$$\rho_{Slurry} = \frac{M_{slurry}}{V_{slurry}} = \frac{M_l + M_s}{V_T} \qquad \text{Equation (5)}$$

Where $M_l$=mass of fluid,
$M_{slurry}$=mass of slurry,
$V_{slurry}$=volume of the slurry,
$M_s$=mass of suspended solids, and
$V_T$=Total Volume of the fluid and suspended solids in vessel The mass of the fluid 104 may be represented by Equation (6).

$$M_l = \rho_l V_l \qquad \text{Equation (6)}$$

Where $\rho_l$ is the density of the fluid and $V_l$ is the volume of the fluid.

Additionally, the volume of the fluid 104 ($V_l$) is the total volume ($V_T$) less the volume of the suspended solids 105 ($V_s$), and the volume of suspended solids 105 ($V_s$) is the mass of the suspended solids 105 ($M_s$) divided by the density ($\rho_s$) of the suspended solids 105, as represented in Equation (7).

$$V_l = V_T - V_s = V_T - \frac{M_s}{\rho_s} \qquad \text{Equation (7)}$$

Furthermore, Equations (6) and (7) can be combined and rearranged as Equation (8).

$$\rho_{Slurry} = \frac{\rho_l \left( V_T - \frac{M_s}{\rho_s} \right) + M_s}{V_T} \qquad \text{Equation (8)}$$

Solving for the mass of the suspended solids 105 ($M_s$) yields Equation (9).

$$M_s = \frac{V_T \rho_s (\rho_{slurry} - \rho_l)}{\rho_s - \rho_l} \qquad \text{Equation (9)}$$

Moreover, because a hydrostatic pressure at the bottom of the hollow tube 108 must be equal to that at the same level in the vessel 102, Equation (10) is true.

$$\rho_{slurry} * g * H_1 = \rho_l * g * H_2 \qquad \text{Equation (10)}$$

where $H_1$=Height of the slurry in tank, and
$H_2$=Height of the fluid in hollow tube 108.

Accordingly, the density of the slurry 124 ($\rho_{slurry}$) can be represented as Equation (11).

$$\rho_{slurry} = \frac{\rho_l * g * H_2}{g * H_1} = \frac{\rho_l H_2}{H_1} \quad \text{Equation (11)}$$

In view of Equations (11) and (9), the mass of the suspended solids 105 ($M_s$) may be represented as Equation (12).

$$M_s = \frac{V_T \rho_s \left(\frac{\rho_l H_2}{H_1} - \rho_l\right)}{\rho_s - \rho_l} = \frac{V_T \rho_s \rho_l}{\rho_s - \rho_l}\left(\frac{H_2}{H_1} - 1\right) \quad \text{Equation (12)}$$

Furthermore, a percentage of suspended solids may be determined. For example, the percentage of suspended solids (% solids) may be represented at Equation (13).

$$\% \text{ solids} = \frac{\rho_s(\rho_{slurry} - \rho_l)}{\rho_{slurry}(\rho_s - \rho_l)} \quad \text{Equation (13)}$$

Furthermore, in view of Equations (11) and (9), Equation (13) may be adjusted as Equation (14).

$$\% \text{ solids} = \frac{\rho_s\left(\frac{\rho_l H_2}{h_1} - \rho_l\right)}{\frac{\rho_l H_2}{H_1}(\rho_s - \rho_l)} = \frac{\rho_s\left(1 - \frac{H_1}{H_2}\right)}{\rho_s - \rho_l} = \frac{\rho_s(H_2 - H_1)}{H_2(\rho_s - \rho_l)} \quad \text{Equation (14)}$$

In view of the foregoing, the mass of the suspended solids 105 with the fluid 104 and a percentage by mass of the suspended solids 105 may be determined.

Figure 2A:
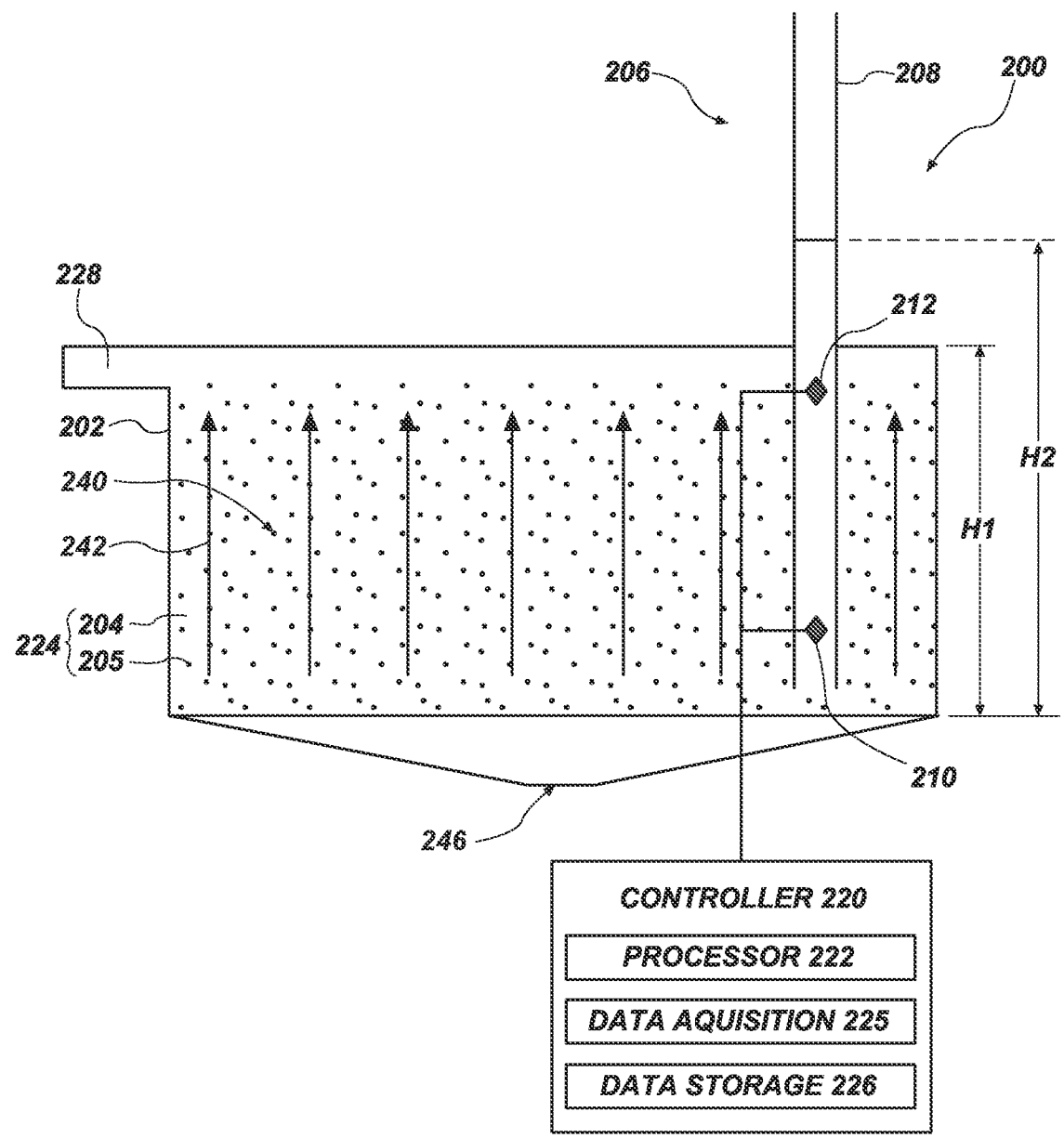
FIGS. 2A and 2B shows schematic diagrams of a measurement system according to one or more additional embodiments of the disclosure.

FIG. 2A is a schematic representation of a mass measurement system 200 according to one or more additional embodiments of the disclosure. The mass measurement system 200 may be utilized to measure (e.g., determine) a mass of suspended solids 205 within a fluid 204 of a fluidized bed 240. The mixture of the fluid 204 and the suspended solids 205 may be referred to herein collectively as a slurry 224. The fluidized bed 240 may be formed via a stream 242 of the fluid 204 being passed up through the solids 205 (e.g., particles of the solids) at a rate high enough to lift the solids 205 and not permit the solids 205 to fall out of the fluid 204. In other words, the stream 242 of the fluid 104 may be passed up through solids 205 at a rate high enough to suspend the solids 205 and to cause the solids 205 to exhibit a dynamic fluid-like state.

Similar to the mass measurement system 100 described above in regard to FIG. 1, the mass measurement system 200 may include a vessel 202 for containing (e.g., holding) the fluid 204, the solids 205, and a probe assembly 206. Furthermore, the mass measurement system 200 may include a fluid inflow 246, a fluid overflow reservoir 228, and a slurry input 234. The fluid inflow 246 may be utilized to create the stream 242 of the fluid 204 for forming the fluidized bed 240 via conventional methods. Furthermore, the fluid overflow reservoir 228 may permit the fluid 204 to overflow as necessary into fluid overflow reservoir 228 responsive to the stream 242 of the fluid 204 per conventional methods.

FIG. 2A represents a scenario having a fluidized bed 240 operating in a batch mode. As used herein, a "batch mode" indicates that the amount of solids 205 within the vessel 202 is not changing significantly. In other words, solids 205 are not being added or removed during the process. However, an overall mass of solids may change as the solids 205 (e.g., carbon resin) absorb other solids (e.g., gold) during the process. Furthermore, the mass measurement system 200 may be utilized in offline (e.g., intermittent) operation to take intermittent measurements and/or in an online (e.g., persistent or continuous) operation to take continuous measurements. In some embodiments, the mass of the suspended solids 205 may be calculated continuously or intermittently. Continuous operation is described in further detail below in regard to FIG. 2B.

Similarly to the probe assembly 106 of FIG. 1, the probe assembly 206 may include a hollow tube 208 and a first sensor 210 and a second sensor 212 disposed within the hollow tube 208, and the probe assembly 206 may operate in the same manner as the probe assembly 106 described above in regard to FIG. 1. Furthermore, in some embodiments, the probe assembly 206 may include a level sensor for measuring and determining a height (H1) of the slurry 224 within the vessel 202. The level sensor 230 is described in greater detail below in regard to FIG. 2B.

Furthermore, the mass measurement system 200 may include a controller 220 operably coupled to the first sensor 210 and the second sensor 212. The controller 220 may include a processor 222, a data acquisition system 225, a data storage device 226 (or a computer-readable medium) for storing data, algorithms, and computer programs. Moreover, the controller 220 may operate in the same manner as the controller 120 described above in regard to FIG. 1. Additionally, the mass of suspended solids 205 may be calculated utilizing the same method and equations described above in regard to FIG. 1. In a batch application, the fluid flow from the fluid inflow 246 may be turned off, and measurements may be taken from the first and second sensors 210, 212 when the fluid 204 and solids 205 are in an non-fluidized state; likewise, the fluid flow from the fluid inflow 246 may be turned on, and measurements may be taken from the first and second sensors 210, 212 when the fluid 204 and solids 205 are in at least a partial fluidized state.

Figure 2B:
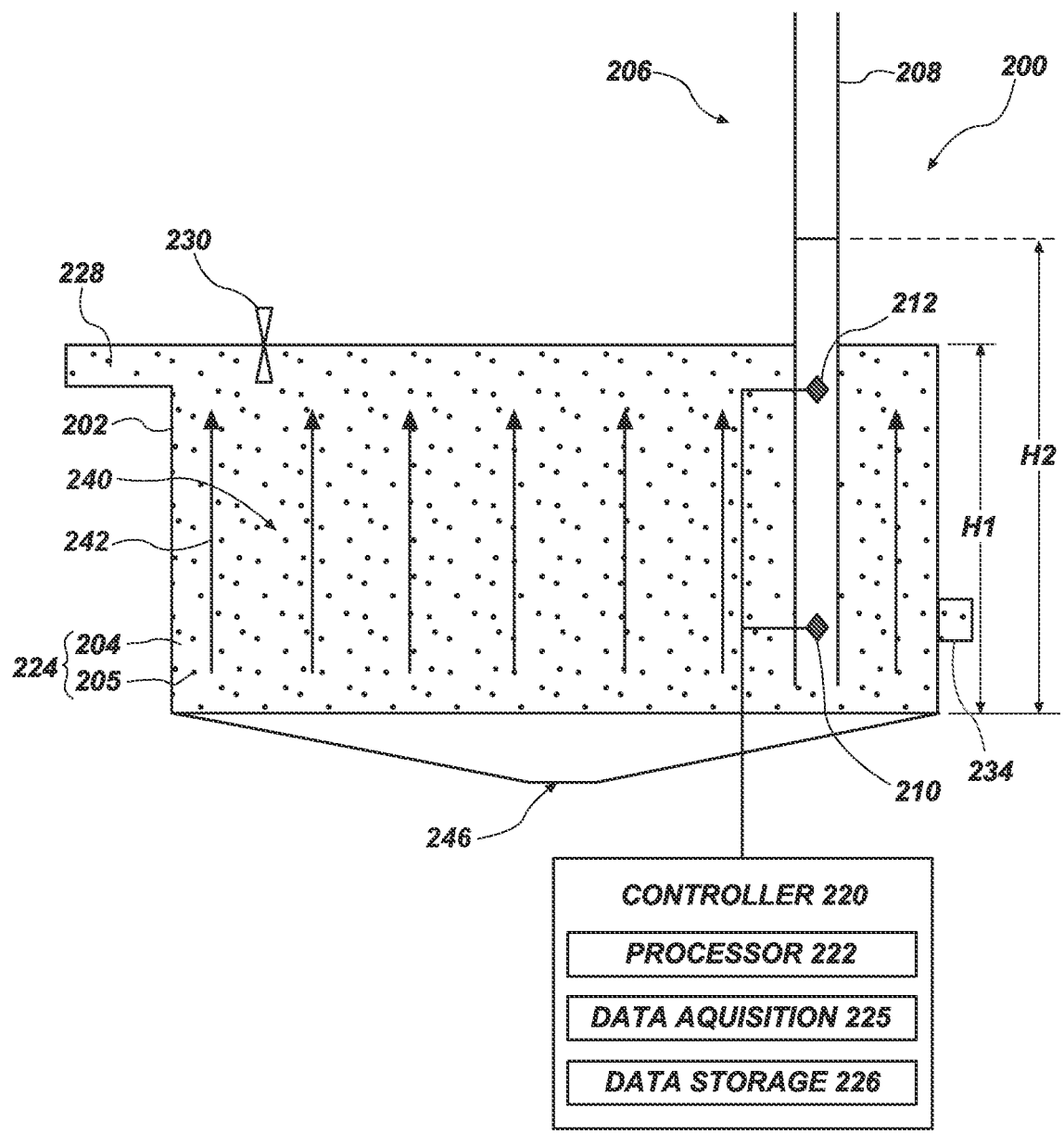

Additionally, the mass measurement system 200 may be utilized in scenarios having a fluidized bed 240 operating in a continuous mode. In a "continuous mode" (or circulating process), the solids 205 may be constantly in motion, so the mass of the solids 205 in the vessel 202 at a given time may be highly variable. As noted above, the mass measurement system 200 may be utilized in offline (e.g., intermittent) operation to take intermittent measurements and/or in an online (e.g., persistent or continuous) operation to take continuous measurements. In some embodiments, the mass of the suspended solids 205 may be calculated continuously or intermittently. FIG. 2B depicts a scenario for operating in a continuous mode. As depicted in FIG. 2B, the mass measurement system 200 may further include a level sensor 230 for measuring or determining a height (H1) of the slurry 224 within the vessel 202.

In one or more embodiments, the level sensor 230 may include an additional pressure sensor (e.g., a bubbler diptube) or a level gauge (e.g., a laser level gauge, an ultrasound level gauge, or a radar level gauge). In some embodiments, the controller 220 may be operably coupled to the level sensor 230 and may receive measurement data from the level sensor 230. The measurement data may include the height (H1) of the fluid 204 and suspended solids 205 (i.e., the slurry 224) within the vessel 202. Utilizing the level sensor 230 to determine the height (H1) of the slurry 224, the mass of suspended solids 205 may be calculated utilizing the same methods and equations described above in regard to FIG. 1.

Figure 3A:
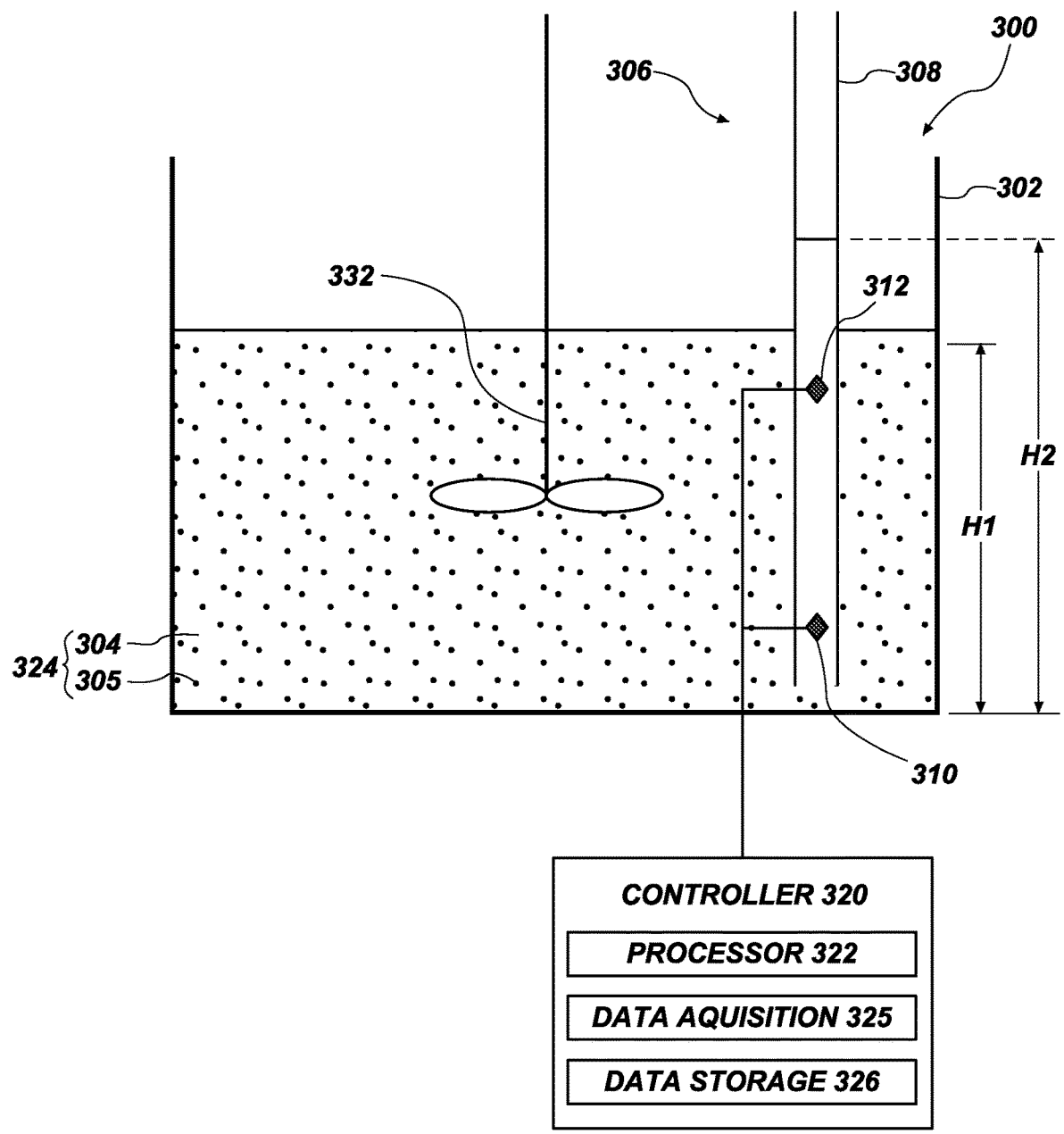
FIGS. 3A and 3B shows schematic diagrams of a measurement system according to one or more additional embodiments of the disclosure.

FIG. 3A is a schematic representation of a mass measurement system 300 according to one or more additional embodiments of the disclosure. The mass measurement system 300 may be utilized to measure (e.g., determine) a mass of suspended solids 305 within a fluid 304 agitated by an agitator 332. The mixture of the fluid 304 and the suspended solids 305 may be referred to herein collectively as a slurry 324.

Similar to the mass measurement system 100 described above in regard to FIG. 1, the mass measurement system 300 may include a vessel 302 for containing (e.g., holding) the fluid 304, the solids 305, and a probe assembly 306. Furthermore, the mass measurement system 300 may include the agitator 332. The agitator 332 may be utilized to impart kinetic energy to the solids 305 and at least partially suspend the solids 305 within the fluid 304 via conventional methods to form the slurry 324. In some embodiments, the agitator 332 may include one or more of a propeller agitator, a helical agitator, an anchor agitator, a paddle agitator, a turbine agitator, or any other conventional agitator. FIG. 3A represents a scenario for operating in a batch mode. As noted above, a "batch mode" indicates that the amount of solids 305 within the vessel 302 is not changing significantly. In some embodiments, the probe assembly 306 may be aligned with agitator 332 along a vertical axis. The mass measurement system 300 may be utilized in offline (e.g., intermittent) operation to take intermittent measurements and/or in an online (e.g., persistent or continuous) operation to take continuous measurements. In some embodiments, the mass of the suspended solids 305 may be calculated continuously or intermittently.

Similarly to the probe assembly 106 of FIG. 1, the probe assembly 306 may include a hollow tube 308 and a first sensor 310 and a second sensor 312 disposed within the hollow tube 308, and the probe assembly 306 may operate in the same manner as the probe assembly 106 described above in regard to FIG. 1. Furthermore, in some embodiments, the probe assembly 306 may include a level sensor for measuring and determining a height (H1) of the slurry 324 within the vessel 302. The level sensor 330 is described in greater detail below in regard to FIG. 3B.

In some embodiments, the height (H1) of the slurry 324 (i.e., the height of the fluid 304 and the solids 305) may be measured (e.g., directly measured), determined based on sensor measurements, or calculated in an un-agitated condition, and height (H2) of the fluid 304 within the hollow tube 308 may be measured within the fluid 304 within the vessel 302 in an agitated state. For example, in a batch application, the agitator 332 may be turned off, and measurements may be taken from the first and second sensors 310, 312 when the fluid 304 and solids 305 are in an un-agitated state; likewise, the agitator 332 may be turned on, and measurements may be taken from the first and second sensors 310, 312 when the fluid 304 and solids 305 are in at least a partial agitated state.

Furthermore, the mass measurement system 300 may include a controller 320 operably coupled to the first sensor 310 and the second sensor 312. The controller 320 may include a processor 322, a data acquisition system 324, a data storage device 326 (or a computer-readable medium) for storing data, algorithms, and computer programs. Moreover, the controller 320 may operate in the same manner as the controller 120 described above in regard to FIG. 1. Additionally, the mass of suspended solids 305 may be calculated utilizing the same methods and equations described above in regard to FIG. 1.

Figure 3B:
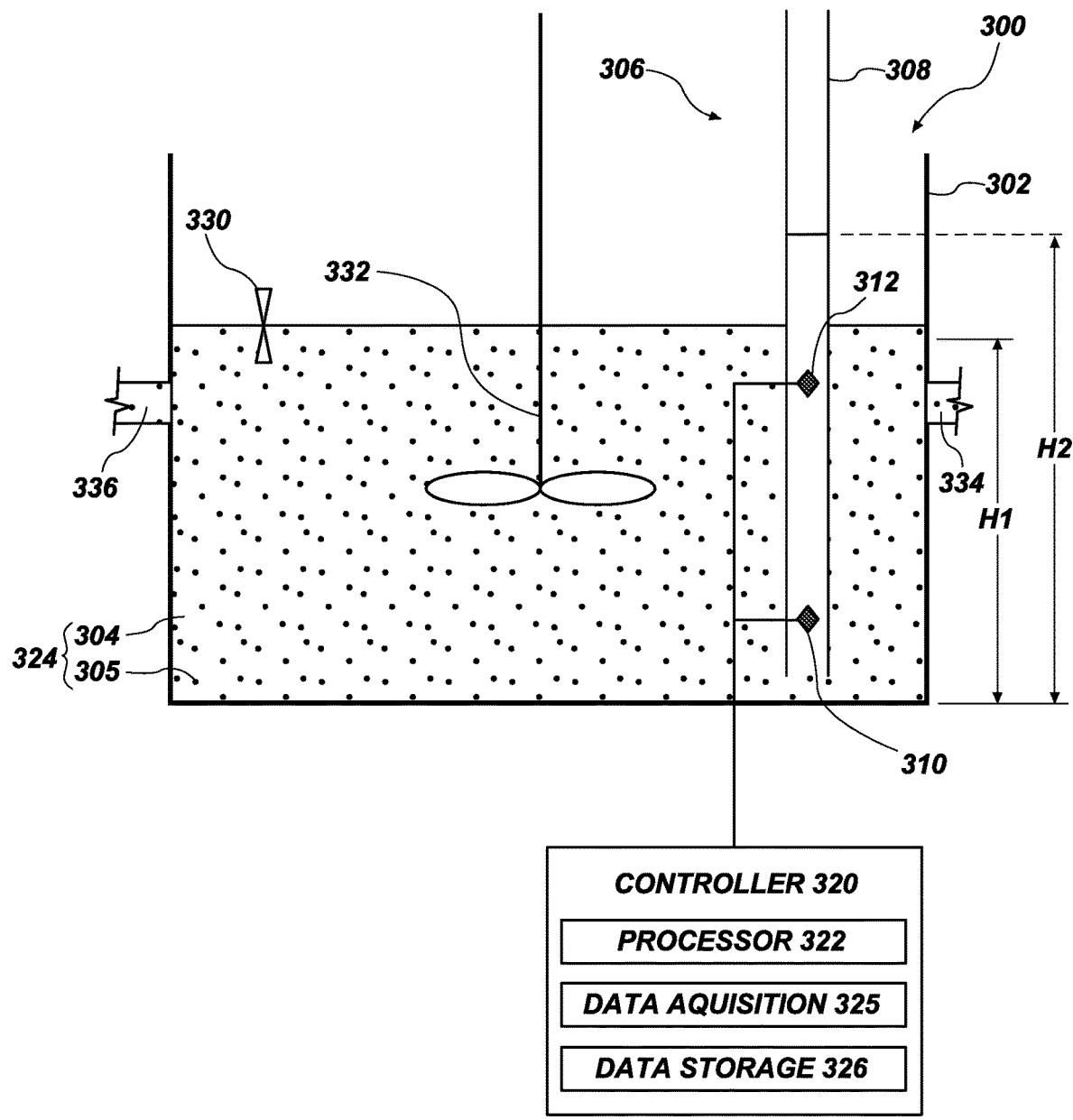

FIG. 3B depicts a scenario for operating in a continuous mode. As mentioned above, "continuous mode" indicates that solids 305 are flowing into and out of the vessel 302. As such, the mass of the suspended solids 305 is continuously variable. As noted above, the mass measurement system 200 may be utilized in offline (e.g., intermittent) operation to take intermittent measurements and/or in an online (e.g., persistent or continuous) operation to take continuous measurements. In some embodiments, the mass of the suspended solids 205 may be calculated continuously or intermittently.

As depicted in FIG. 3B, the mass measurement system 300 may further include a level sensor 330 for measuring or determining a height (H1) of the slurry 324 within the vessel 302 and an input 334 and an output 336 for passing fluid 304 through the vessel 302. The level sensor 330 may include any of the level sensors described above and may operate via any of the manners described above. Utilizing the level sensor 330 to determine the height (H1) of the slurry 324, the mass of suspended solids 305 may be calculated utilizing the same method and equations described above in regard to FIG. 1.

Figure 4:
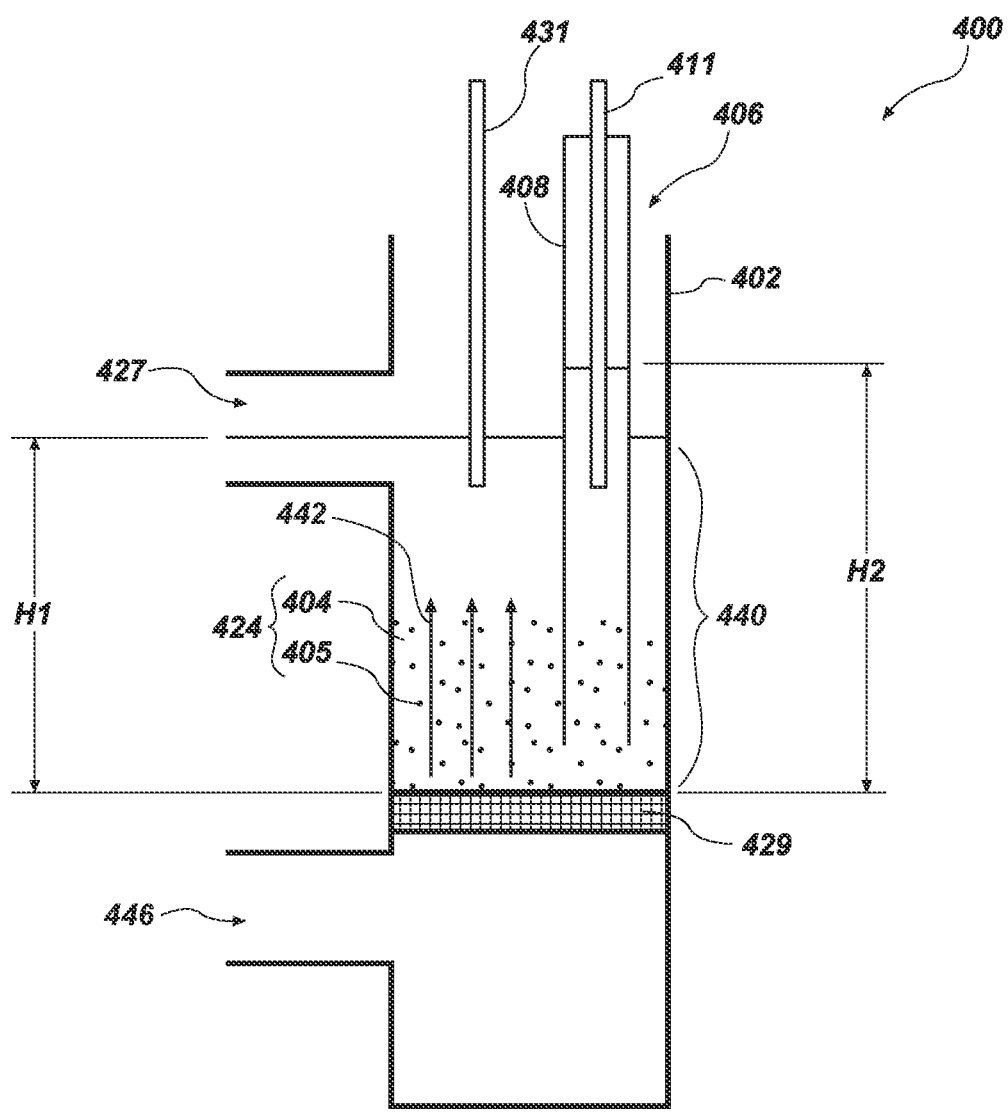
FIG. 4 shows a schematic diagram of a measurement system according to one or more additional embodiments of the disclosure.

FIG. 4 a schematic representation of a mass measurement system 400 according to one or more additional embodiments of the disclosure. The mass measurement system 400 may include a vessel 402, a fluid 404, solids 405, a fluidized bed 440 and a probe assembly 406. The mass measurement system 400 may further include an inlet 446 (e.g., a fluid inflow), an outlet 427, and a screen 429 between the inlet 446 and the outlet 427 for preventing the solids 405 from settling into the inlet 446. The inlet 446 may be utilized to generate a stream 442 to form the fluidized bed 440, as described above in regard to FIG. 2A.

The mass measurement system 400 may also include a pressure sensor 431 within the vessel 402 and outside of the probe assembly 406. The pressure sensor 431 may be utilized to determine the height (H1) of the slurry 424 within the vessel 402 during operation. The probe assembly 406 may include a single pressure sensor 411 within a hollow tube 408. Furthermore, the single pressure sensor 411 may be translatable vertically up and down in order to acquire measurements at differing depths within the hollow tube 408. Moreover, based on the measurements acquired via the single pressure sensor 411, the mass of suspended solids 405 may be calculated utilizing the same methods and equations described above in regard to FIG. 1.

Referring to FIGS. 1-4 together, the mass measurement systems and methods of the disclosure may provide advantages over conventional systems and methods for determining masses of solids suspended within fluid. For example, the mass measurement systems and methods of the disclosure may be utilized to determine densities of fluids having solids suspended therein and/or fluids that are not aqueous based. Moreover, at least some embodiments of the mass measurement systems and the methods of the disclosure are not subject to errors generated by measuring pressures within turbulent systems. Additionally, because the mass measurement systems and methods of the disclosure may provide continuous measurements, when mixing batches of slurries (e.g., products), a user of the mass measurement systems will be able to control the masses of solids (e.g., solids content) within slurries on a continuous basis. Furthermore, in accountability tank applications (e.g., metal processing of gold, uranium, etc.), sludge often builds up, and the mass measurement systems and methods of the disclosure may inform a user as to whether a cleanup is necessary, or an estimate of the accountable material (e.g., gold, uranium, etc.) within a vessel. The foregoing advantages may reduce downtime from unnecessary cleanups.

Additionally, in accountability tanks and metal processing applications, sludge frequently builds up in the processing tank. Using an agitator, the particles of the sludge and/or the metal can be suspended in a slurry and their masses measured via the mass measurement systems. Moreover, in agitated dissolving tanks, solid materials such as lime, flue dust, or salts are added to a fluid to be dissolved. The mass measurement systems and methods of the disclosure may enable an extent of the dissolution of the solid materials on a batch or continuous process to be monitored.

Additionally, the systems and methods described herein are applicable to various applications of chemical reactors. For example, the systems and methods could be utilized where two chemicals (liquid/solids) are mixed, and the systems and methods could be utilized to monitor a resulting solution density and an amount of suspended solids within the solution, where both the solution density and the amount of suspended solids could change in real time as a reaction occurs. Additionally, a solid catalyst could be used between two liquid reactants. The systems and methods described herein would allow for monitoring an amount of catalyst remaining in the combination. The foregoing would be especially useful in a continuous reactor type system.

The following tables include results from testing performed by the inventors:

In a first set of test, a single sensor was utilized to take pressure measurements at two different depths. The differential distance ($\Delta H$) was 0.3723 m. At each depth, 3.0 minutes of data was collected, in which the average bubble peak pressure was calculated along with standard deviations. Results of these tests and density calculations performed according to the methods described herein are shown below in Table 1. At a zero-flow condition, the calculated density matched the accepted values to within 0.1% and were typically consistent within uncertainties. At flowing conditions, the percent difference between the calculated and the accepted densities were within 0.2%, which shows a high degree of accuracy under a realistic flowing configuration.

TABLE 1

Calculated density values under different flow conditions and temperatures

| Valve Position (degrees) | Offset (in) | T (° C.) | T Unc. | Calculated Density (kg/m3) | Density Unc. | Literature Density (kg/m3) | % Difference |
|---|---|---|---|---|---|---|---|
| 30 | 0.125 | 22.79 | 0.09 | 995.88 | 4.02 | 997.45 | 0.16 |
| 30 | 1 | 24.46 | 0.05 | 999.08 | 4.46 | 997.07 | −0.20 |
| 45 | 0.125 | 21.56 | 0.05 | 998.26 | 4.52 | 997.74 | −0.05 |
| 45 | 1 | 23.52 | 0.06 | 995.74 | 5.02 | 997.29 | 0.16 |
| 0 | 0.125 | 25.09 | 0.01 | 996.48 | 0.35 | 996.92 | 0.04 |
| 0 | 1 | 25.24 | 0.02 | 996.61 | 0.38 | 996.89 | 0.03 |
| 0 | 0.125 | 22.08 | 0.01 | 997.06 | 0.31 | 997.62 | 0.06 |
| 0 | 1 | 25.62 | 0.02 | 996.61 | 0.42 | 996.80 | 0.02 |
| 0 | 0.125 | 23.96 | 0.01 | 996.78 | 0.31 | 997.18 | 0.04 |
| 0 | 1 | 23.94 | 0.02 | 997.07 | 0.36 | 997.19 | 0.01 |
| 0 | 0.125 | 24.79 | 0.01 | 997.95 | 1.78 | 996.99 | −0.10 |
| 0 | 1 | 25.42 | 0.01 | 996.76 | 0.33 | 996.85 | 0.01 |

Additional testing was performed to discover proper operating parameters to achieve accurate mass and percentage of solids measurements. The results and associated test conditions are shown in Table 2. In the tests, the actual mass of the suspended solids was 9.47 lbs. It was determined that the greater the distance the hollow tube was from a bottom of the vessel (e.g., the greater D2 was), the accuracy of the calculation decreased. Furthermore, for flow parameters, at a 22.5° open valve position and zero percent fluid expansion, an accuracy of the calculations decreased.

TABLE 2

Design of experiments results

| Valve Position (°) | % Expansion | Hollow Offset distance (D2) from bottom of vessel in inches) | | | | | |
|---|---|---|---|---|---|---|---|
| | | 0 | 0.125 | 0.5 | 1 | 1.5 | 2 | 3 |
| 22.5 | 0 | 7.458 | | | | | | |
| 30 | 125 | 9.096 | 8.886 | | 8.386 | | | |
| 37.5 | 175 | 9.399 | | 9.179 | | | 8.334 | 7.763 |
| 45 | 225 | 9.488 | 9.452 | 9.236 | 9.063 | 8.728 | 8.441 | 8.040 |
| 52.5 | 282 | 9.576 | 9.598 | 9.244 | 9.059 | 8.931 | 8.656 | 8.320 |

Further testing results are shown below in Table 3.

TABLE 3

Testing results

| Valve Position (°) | Carbon % Expansion | D2 (inches) | Mass (lbs) | Mass Unc. (lbs) | Mass % Difference | % Solids | % Solids Unc. | % Solids % Difference |
|---|---|---|---|---|---|---|---|---|
| 22.5 | 0 | 0 | 7.458 | 0.20 | 23.74 | 6.859 | 0.18 | 21.02 |
| 30.0 | 124.1 | 0 | 9.096 | 0.20 | 4.01 | 8.184 | 0.18 | 3.43 |
| 37.5 | 175.9 | 0 | 9.399 | 0.20 | 0.73 | 8.401 | 0.18 | 0.81 |
| 45.0 | 227.6 | 0 | 9.488 | 0.20 | −0.21 | 8.483 | 0.17 | −0.15 |
| 52.5 | 282.8 | 0 | 9.576 | 0.18 | −1.13 | 8.564 | 0.14 | −1.10 |
| 30.0 | 175.9 | 0.125 | 8.886 | 0.18 | 6.34 | 8.023 | 0.17 | 5.43 |
| 45.0 | 227.6 | 0.125 | 9.452 | 0.19 | 0.17 | 8.463 | 0.17 | 0.08 |
| 52.5 | 282.8 | 0.125 | 9.598 | 0.23 | −1.37 | 8.580 | 0.18 | −1.29 |
| 37.5 | 175.9 | 0.5 | 9.179 | 0.31 | 3.10 | 6.250 | 0.17 | 30.17 |
| 45.0 | 227.6 | 0.5 | 9.236 | 0.23 | 2.47 | 7.773 | 0.19 | 8.58 |
| 52.5 | 282.8 | 0.5 | 9.244 | 0.17 | 2.39 | 8.526 | 0.16 | −0.66 |
| 30.0 | 124.1 | 1 | 8.386 | 0.21 | 12.12 | 7.539 | 0.17 | 11.63 |
| 45.0 | 227.6 | 1 | 9.063 | 0.22 | 4.36 | 8.151 | 0.17 | 3.83 |
| 52.5 | 282.8 | 1 | 9.059 | 0.24 | 4.41 | 8.564 | 0.14 | −1.10 |
| 37.5 | 175.9 | 1.5 | 8.587 | 0.32 | 9.76 | 7.029 | 0.19 | 18.60 |
| 45.0 | 227.6 | 1.5 | 8.728 | 0.27 | 8.12 | 8.580 | 0.18 | −1.29 |
| 52.5 | 282.8 | 1.5 | 8.931 | 0.14 | 5.84 | 8.527 | 0.15 | −0.67 |
| 37.5 | 175.9 | 2 | 8.334 | 0.35 | 12.74 | 7.806 | 0.16 | 8.16 |
| 45.0 | 227.6 | 2 | 8.441 | 0.24 | 11.46 | 6.245 | 0.18 | 30.24 |
| 52.5 | 282.8 | 2 | 8.656 | 0.17 | 8.95 | 6.630 | 0.17 | 24.37 |
| 37.5 | 175.9 | 3 | 7.763 | 0.36 | 19.78 | 8.483 | 0.17 | −0.16 |
| 45.0 | 227.6 | 3 | 8.040 | 0.24 | 16.31 | 7.042 | 0.17 | 18.41 |
| 52.5 | 282.8 | 3 | 8.320 | 0.23 | 12.90 | 5.428 | 0.20 | 43.78 |
| 45.0 | 230.8 | 0 | 8.681 | 0.21 | −0.34 | 7.798 | 0.17 | −0.32 |
| 45.0 | 226.1 | 0 | 7.812 | 0.20 | −0.26 | 7.045 | 0.17 | −0.25 |
| 45.0 | 214.6 | 0 | 6.890 | 0.22 | −0.44 | 6.240 | 0.19 | −0.43 |
| 45.0 | 222.2 | 0 | 5.973 | 0.20 | −0.26 | 5.431 | 0.17 | −0.26 |

In view of the foregoing, a minimum offset (D2) of less than 0.5 inches and with a fluid/bed expansion of 175% or more may increase accuracy of the calculations.

Referring still to FIGS. 1-4 together, embodiments of the disclosure include mass measurement systems within mixing tanks, thickeners, clarifiers, hydro-cyclone banks, pump head boxes, Carbon in Leach (CIL), Carbon in Pulp (CIP), Carbon in Column (CIC), resin in leach (RIL), resin in pulp (RIP), resin in column (RIC), classifier systems, and reactor systems. Additionally, embodiments of the disclosure include mass measurement systems utilized within metallurgical, chemical, oil, gas, food, dairy, and pharmaceutical industries.

Referring still to FIGS. 1-4 together, some embodiments of the present disclosure do not include a vessel. Rather, the fluid and solids may be contained in natural formations such as, for example, a puddle, a pond, a lake, a sea, and/or an ocean.

Figure 5:
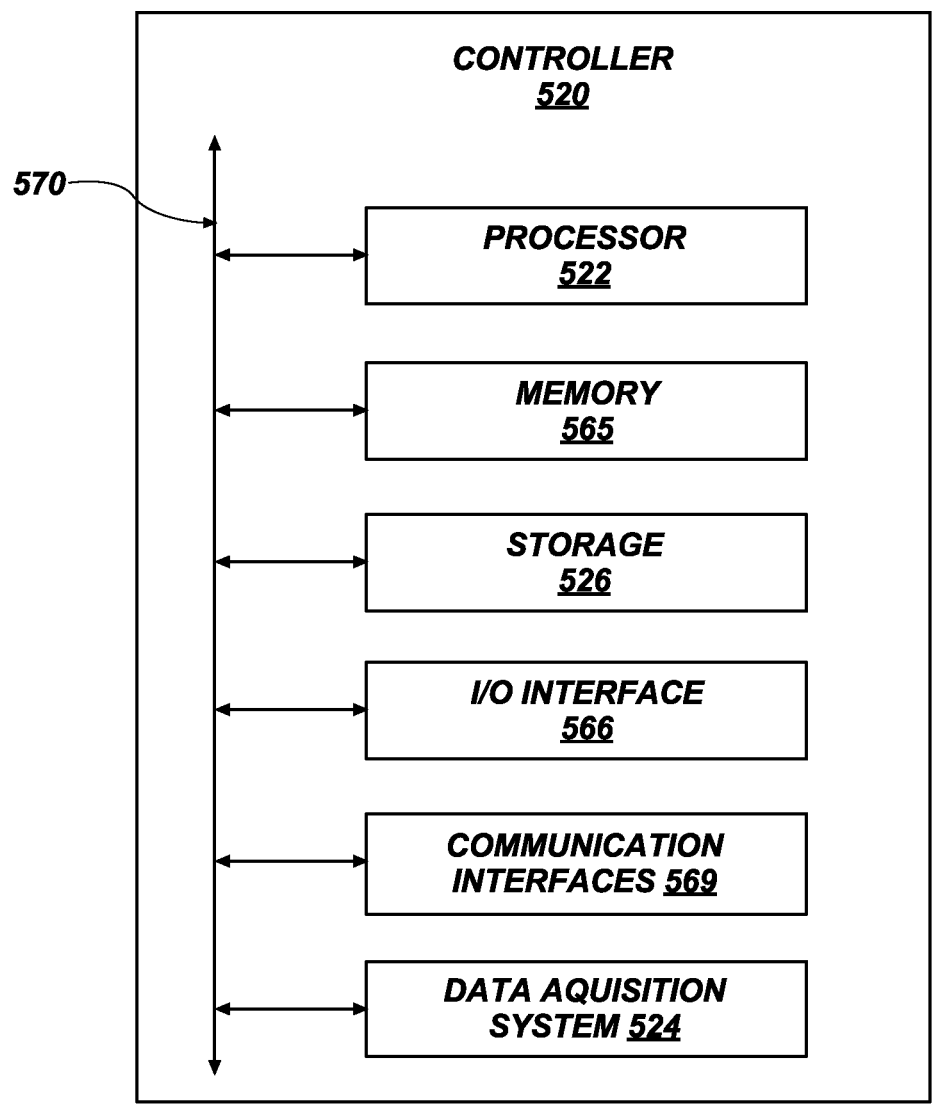
FIG. 5 shows a block diagram of a controller according to one or more embodiments of the disclosure.

FIG. 5 illustrates a block diagram of an example controller 520 that may be configured to cause any one or more of the processes of the mass measurement systems described above. One will appreciate that one or more computing devices may form the controller 520 of the mass measurement systems. As shown by FIG. 5, the controller 520 can comprise a processor 522, a memory 565, a storage device 526, an I/O interface 566, a data acquisition system 524, and a communication interface 569, which may be communicatively coupled by way of a communication infrastructure. While an example controller 520 is shown in FIG. 5, the components illustrated in FIG. 5 are not intended to be limiting. Additional or alternative components may be used in other embodiments. Furthermore, in certain embodiments, the controller 520 can include fewer components than those shown in FIG. 5. Components of the controller 520 shown in FIG. 5 will now be described in additional detail.

In one or more embodiments, the processor 522 includes hardware for executing instructions, such as those making up a computer program. As an example, and not by way of limitation, to execute instructions, the processor 522 may retrieve (or fetch) the instructions from an internal register, an internal cache, the memory 565, or the storage device 526 and decode and execute them. In one or more embodiments, the processor 522 may include one or more internal caches for data, instructions, or addresses. As an example, and not by way of limitation, the processor 522 may include one or more instruction caches, one or more data caches, and one or more translation look aside buffers (TLBs). Instructions in the instruction caches may be copies of instructions in the memory 565 or the storage 526.

The controller 520 includes memory 565, which is coupled to the processor(s) 522. The memory 565 may be used for storing data, metadata, and programs for execution by the processor(s). The memory 565 may include one or more of volatile and non-volatile memories, such as Random-Access Memory ("RAM"), Read-Only Memory ("ROM"), a solid state disk ("SSD"), Flash, Phase Change Memory ("PCM"), or other types of data storage. The memory 565 may be internal or distributed memory.

The controller 520 includes a storage device 526 that includes storage for storing data or instructions. As an example, and not by way of limitation, storage device 526 can comprise a non-transitory storage medium described above. The storage device 526 may include a hard disk drive (HDD), a floppy disk drive, Flash memory, an optical disc, a magneto-optical disc, magnetic tape, or a Universal Serial Bus (USB) drive or a combination of two or more of these. The storage device 526 may include removable or non-removable (or fixed) media, where appropriate. The storage device 526 may be internal or external to the controller 520.

In one or more embodiments, the storage device 526 is non-volatile, solid-state memory. In other embodiments, the storage device 526 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or Flash memory or a combination of two or more of these.

The controller 520 also includes one or more input or output ("I/O") devices/interfaces 566 (e.g., a touch display), which are provided to allow a user to provide input to, receive output from, and otherwise transfer data to and receive data from controller 520. The I/O devices/interfaces 566 may include a mouse, a keypad or a keyboard, a touch screen, a camera, an optical scanner, network interface, modem, other known I/O devices or a combination of such I/O device/interfaces. The touch screen may be activated with a stylus or a finger.

The I/O devices/interfaces 566 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 566 is configured to provide graphical data to a display for presentation to a user. The graphical data may be representative of one or more graphical user interfaces and/or any other graphical content as may serve a particular implementation.

The data acquisition system 524 may receive signals from one or more of the first sensor and the second sensor and may include, or have associated therewith, analog to digital conversion circuitry to convert the analog signals from the above-mentioned elements and any other various sensors into digital numeric values that can be manipulated and/or analyzed by the controller 520 (e.g., the processor 522 and/or the data acquisition system 524 of the controller 520). The data acquisition system 524 may further include one or more software programs developed using various general purpose programming languages such as Assembly, BASIC, C, C++, C#, Fortran, Java, LabVIEW, Lisp, Pascal, Ladder Logic, etc. As a non-limiting example, the controller 520 may include any data acquisition system known in the art.

The controller 520 can further include a communication interface 569. The communication interface 569 can include hardware, software, or both. The communication interface 569 can provide one or more interfaces for communication (such as, for example, packet-based communication) between the controller 520 and one or more other computing devices or networks. As an example, and not by way of limitation, the communication interface 569 may include a network interface controller (NIC) or network adapter for communicating with an Ethernet or other wire-based network or a wireless NIC (WNIC) or wireless adapter for communicating with a wireless network, such as a WI-FI and/or Bluetooth. The controller 520 can further include a bus 570. The bus 570 can comprise hardware, software, or both that couples components of controller 520 to each other.

Figure 6:
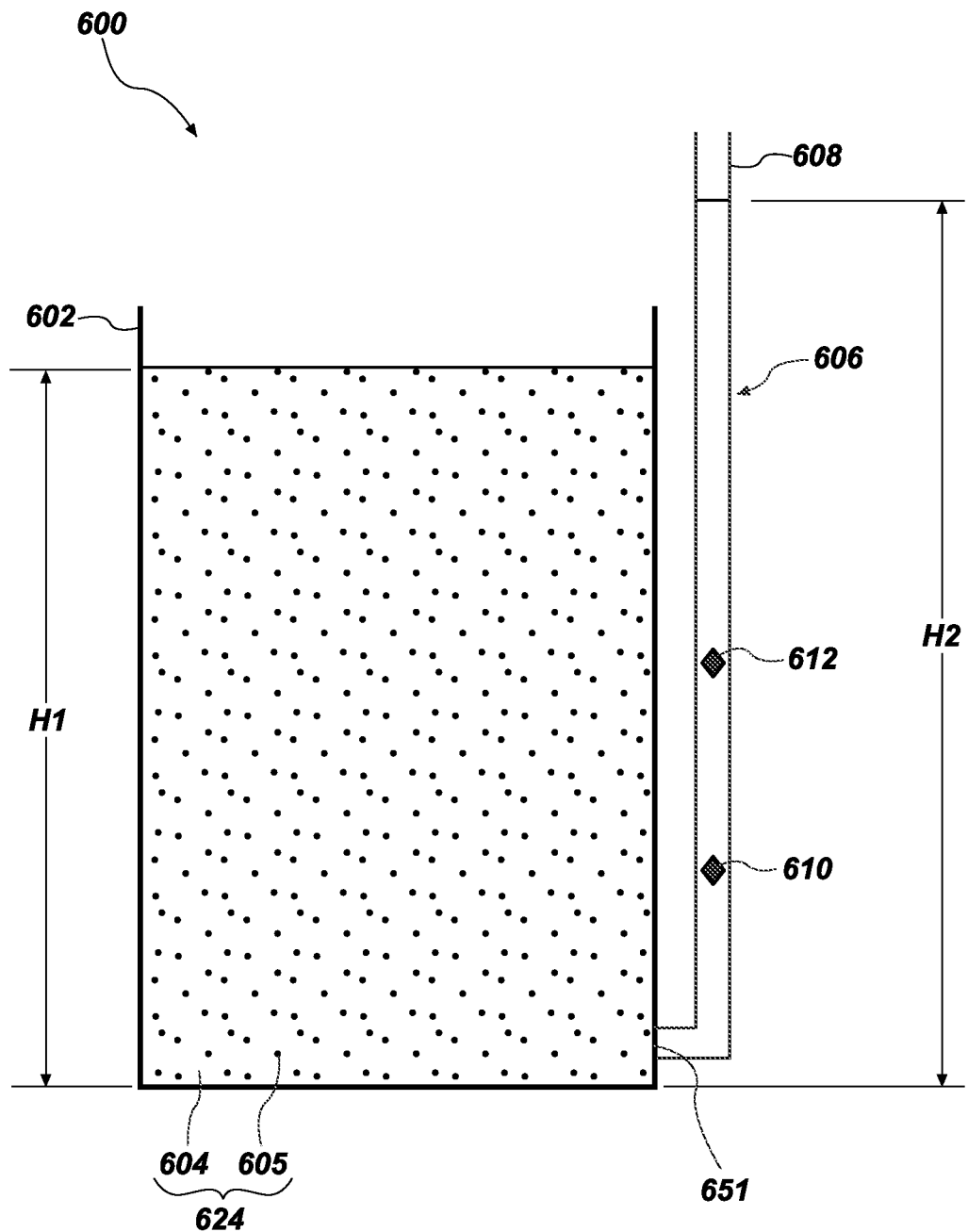
FIG. 6 is a schematic representation of a mass measurement system according to one or more additional embodiments of the disclosure.

FIG. 6 a schematic representation of a mass measurement system 600 according to one or more additional embodiments of the disclosure. The mass measurement system 600 may include a vessel 602, a fluid 604, solids 605, a fluidized bed or an agitator, and a probe assembly 606. In some embodiments, the mass measurement system 600 may further include inlets and outlets as appropriate.

As shown in FIG. 6, the probe assembly 606 and be oriented outside of the vessel 602 but may be in fluid communication with the vessel 602. For example, the probe assembly 606 may be open to a lower portion of the vessel 602 and may receive the fluid 604 from the vessel 602. In some embodiments, a permeable barrier 651 may be disposed between the probe assembly 606 and the vessel. In one or more embodiments, the permeable barrier 651 may include one or more of a screen, a mesh structure, a foam material, or any other structure that may enable the fluid 604 to pass therethrough while substantially preventing the solids 605 from passing therethrough. For instance, the permeable barrier 651 may be specific to the combination of the fluid 604 and the solids 605. In some embodiments, the mass measurement system 600 may not include a permeable barrier.

The probe assembly 606 may include a hollow tube 608 and a first sensor 610 and a second sensor 612 disposed within the hollow tube 608. The hollow tube 608 extends above a slurry height (H1) within the vessel 602. In some embodiments, the hollow tube 608 may include a hollow column. In additional embodiments, the hollow tube 608 may include an additional vessel or tank. For instance, measurements may be made with two vessels (e.g., ponds) in fluid communication with each other.

The probe assembly 606 may operate in the same manner as the probe assembly 106 described above in regard to FIG. 1. Furthermore, in some embodiments, the probe assembly 606 may include a level sensor for measuring and determining a height (H1) of the slurry 624 within the vessel 602.

Referring still to FIG. 6 in some embodiments, the hollow tube 608 may include a right angle portion 653 proximate a connection with the vessel 602, which will change direction of any flow within the hollow tube 608 by substantially 90 degrees. In some embodiments, the right angle portion 653 may reduce turbulent flow within a portion of the hollow tube 608 where measurements are taken by the first and second sensors 610, 612 and may assist in yielding more accurate measurements.

Figure 7:
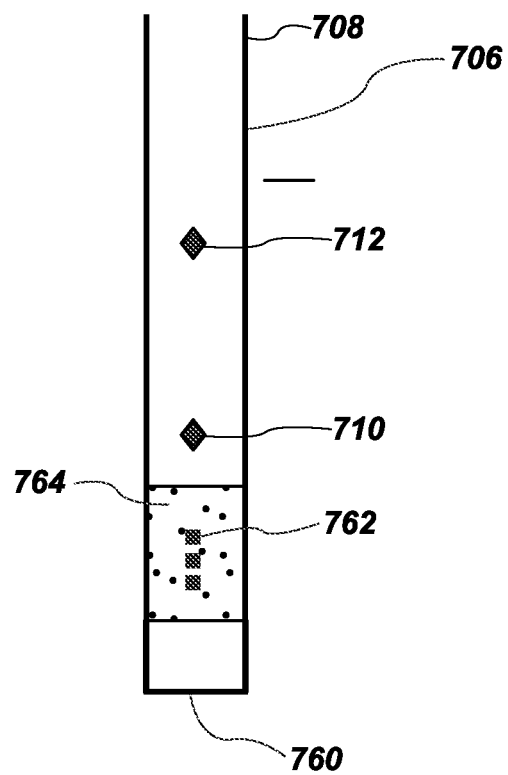
FIG. 7 shows a probe assembly according to one or more embodiments of the present disclosure.

FIG. 7 depicts a probe assembly 706 according to one or more embodiments of the present disclosure. The probe assembly 706 may include a hollow tube 708 and a first sensor 710 and a second sensor 712 disposed within the hollow tube 708. However, the hollow tube 708 may not be open at a lower end. Rather, the hollow tube 708 may be closed at the lower end or may include a plug 760 disposed within the lower end. Furthermore, the hollow tube 708 may include one or more apertures 762 extending through a sidewall of the hollow tube 708 and a permeable barrier 764 at least substantially covering the one or more apertures 762. For example, the lower end of the hollow tube 708 may be perforated. The permeable barrier 764 may include one or more of a screen, a mesh structure, a foam material, or any other structure that may enable the fluid to pass therethrough while substantially preventing the solids from passing therethrough. In some embodiments, the probe assembly 706 may not include the permeable barrier 764. The disclosure further include the following embodiments:

Embodiment 1. A measurement system, comprising: a vessel for containing a fluid and at least one solid material; and a probe assembly for disposing partially into the fluid within the vessel, the probe assembly comprising: a hollow tube having an open lower longitudinal end; and at least one pressure sensor within the hollow tube, the at least one pressure sensor configured to measure pressures of the fluid within the hollow tube at at least two different elevations.

Embodiment 2. The measurement system of embodiment 1, wherein a longitudinal axis of the probe assembly is configured to extend in an at least substantially vertical direction when disposed at least partially into the fluid of the vessel.

Embodiment 3. The measurement system of any one of embodiments 1 and 2, wherein the hollow tube comprises an open upper longitudinal end.

Embodiment 4. The measurement system of any one of embodiments 1 through 3, wherein the at least one pressure sensor comprises one or more of a bubbler system, an electronic pressure transducer, a strain gauge, a capacitive sensor, an electromagnetic sensor, a piezoelectric sensor, or an optical sensor.

Embodiment 5. The measurement system of any one of embodiments 1 through 4, wherein the at least one pressure sensor comprises at least two pressure sensors.

Embodiment 6. The measurement system of embodiment 5, wherein each of the at least two pressure sensors comprises a bubbler system, an electronic pressure transducer, a strain gauge, a capacitive sensor, an electromagnetic sensor, a piezoelectric sensor, or an optical sensor.

Embodiment 7. The measurement system of any one of embodiments 1 through 6, further comprising a level sensor configured to be disposed within the vessel.

Embodiment 8. The measurement system of embodiment 7, wherein the level sensor comprises an additional pressure sensor.

Embodiment 9. The measurement system of any one of embodiments 1 through 8, wherein the vessel comprises a fluidized bed.

Embodiment 10. The measurement system of any one of embodiments 1 through 9, further comprising at least one agitator for agitating the fluid and the at least one solid material.

Embodiment 11. The measurement system of any one of embodiments 1 through 10, wherein the at least two different elevations are at least 4.0 inches apart in a vertical direction.

Embodiment 12. The measurement system of any one of embodiments 1 through 11, wherein a distance between the lower longitudinal end of the hollow tube and a bottom surface of the vessel is within a range of about 0.0 inch and about 5.00 inches.

Embodiment 13. A measurement system, comprising: a vessel for containing a slurry mixture of a fluid and at least one solid material; and a probe assembly configured to be suspended partially within the slurry mixture, the probe assembly comprising: a hollow tube having an open lower longitudinal end; a first pressure sensor disposed within the hollow tube and oriented at a first axial location along a longitudinal axis of the hollow tube; and a second pressure sensor disposed within the hollow tube and oriented at a second axial location along the longitudinal axis of the hollow tube; and a controller operably coupled to the first and second pressure sensor and comprising: at least one processor; and at least one non-transitory computer-readable storage medium storing instructions thereon that, when executed by the at least one processor, cause the controller to: receive pressure data from the first and second pressure sensors; and based on the received pressure data, determine a mass of the at least one solid material within the vessel.

Embodiment 14. The measurement system of embodiment 13, further comprising instructions that, when executed by the at least one processor, cause the controller to determine a percentage by mass of the at least one solid material relative to fluid within the vessel.

Embodiment 15. The measurement system of any one of embodiments 13 and 14, wherein each of the first and the second pressure sensors comprises a bubbler system, an electronic pressure transducer, a strain gauge, a capacitive sensor, an electromagnetic sensor, a piezoelectric sensor, or an optical sensor.

Embodiment 16. The measurement system of any one of embodiments 13 through 15, further comprising a level sensor configured to be disposed within the vessel.

Embodiment 17. A method of measuring a mass of suspended solids within a fluid the method comprising: receiving pressure measurements representing two different elevations of the fluid within a hollow tube and substantially free of the suspended solids; and based at least partially on the received pressure measurements, determining a mass of the suspended solids.

Embodiment 18. The method of embodiment 17, further comprising receiving height data indicating a first height the fluid and suspended solids within a vessel outside of the hollow tube.

Embodiment 19. The method of embodiment 18, further comprising determining a second height of the fluid within the hollow tube, wherein the mass of the suspended solids is determined based at least partially on a difference between the first height and the second height.

Embodiment 20. The method of any one of embodiments 17 through 19, wherein the two different elevations are spaced apart by at least 4.0 inches in a vertical direction.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A measurement system, comprising:
 a vessel configured to contain a fluid and at least one solid material; and
 a probe assembly comprising a tubular assembly configured and positioned to be partially disposed into the fluid when contained within the vessel, the tubular assembly comprising:
  a hollow tube having an open lower longitudinal end positioned to be disposed within and in communication with the fluid when contained within the vessel and an open upper longitudinal end positioned to be disposed above the vessel and arranged to remain open while the tubular assembly is partially disposed into the fluid; and
  at least one pressure sensor positioned within the hollow tube, the at least one pressure sensor configured to measure pressures of the fluid within the hollow tube at at least two different elevations within the hollow tube.

2. The measurement system of claim 1, wherein a longitudinal axis of the probe assembly is configured to extend in an at least substantially vertical direction when disposed at least partially into the fluid of the vessel.

3. The measurement system of claim 1, wherein the at least one pressure sensor comprises one or more of a bubbler system, an electronic pressure transducer, a strain gauge, a capacitive sensor, an electromagnetic sensor, a piezoelectric sensor, or an optical sensor.

4. The measurement system of claim 1, wherein the at least one pressure sensor comprises at least two pressure sensors.

5. The measurement system of claim 4, wherein each of the at least two pressure sensors independently comprises a bubbler system, an electronic pressure transducer, a strain gauge, a capacitive sensor, an electromagnetic sensor, a piezoelectric sensor, or an optical sensor.

6. The measurement system of claim 1, further comprising a level sensor configured to be disposed within the vessel.

7. The measurement system of claim 6, wherein the level sensor comprises an additional pressure sensor.

8. The measurement system of claim 1, wherein the vessel comprises a fluidized bed.

9. The measurement system of claim 1, further comprising at least one agitator for agitating the fluid and the at least one solid material.

10. The measurement system of claim 1, wherein the at least two different elevations are at least about 4.0 inches apart in a vertical direction.

11. The measurement system of claim 1, wherein a distance between the lower longitudinal end of the hollow tube and a bottom surface of the vessel is within a range of about 0.0 inch and about 5.00 inches, positioning of the lower longitudinal end relative to the bottom surface of the vessel being selected to reduce agitation of the fluid within the hollow tube and substantially free of the fluid within the hollow tube of the at least one solid material.

12. A measurement system, comprising:
a vessel configured to contain a slurry mixture of a fluid and at least one solid material; and
a probe assembly comprising a tubular assembly configured to be suspended partially within the slurry mixture, the tubular assembly comprising:
a hollow tube having an open lower longitudinal end configured to be disposed within the fluid and an open upper longitudinal end configured to be suspended above the vessel and arranged to remain open while the tubular assembly is suspended partially within the slurry mixture;
a first pressure sensor disposed within the hollow tube and oriented at a first axial location along a longitudinal axis of the hollow tube; and
a second pressure sensor disposed within the hollow tube and oriented at a second axial location along the longitudinal axis of the hollow tube; and
a controller operably coupled to the first and second pressure sensor and comprising:
at least one processor; and
at least one non-transitory computer-readable storage medium storing instructions thereon that, when executed by the at least one processor, cause the controller to:
receive pressure data from the first and second pressure sensors; and
based on the received pressure data, determine a mass of the at least one solid material within the vessel.

13. The measurement system of claim 12, further comprising instructions that, when executed by the at least one processor, cause the controller to determine a percentage by mass of the at least one solid material relative to fluid within the vessel.

14. The measurement system of claim 12, wherein each of the first and the second pressure sensors independently comprises a bubbler system, an electronic pressure transducer, a strain gauge, a capacitive sensor, an electromagnetic sensor, a piezoelectric sensor, or an optical sensor.

15. The measurement system of claim 12, further comprising a level sensor configured to be disposed within the vessel.

16. A method of measuring a mass of suspended solids within a fluid, the method comprising:
receiving pressure measurements representing two different elevations of the fluid within a hollow tube having an open lower longitudinal end positioned within and in communication with the fluid and an open upper longitudinal end positioned above a vessel and arranged to remain open, the fluid within the hollow tube being substantially free of the suspended solids; and
based at least partially on the received pressure measurements, determining a mass of the suspended solids.

17. The method of claim 16, further comprising receiving height data indicating a first height of the fluid and suspended solids within the vessel outside of the hollow tube.

18. The method of claim 17, further comprising determining a second height of the fluid within the hollow tube, wherein the mass of the suspended solids is determined based at least partially on a difference between the first height and the second height.

19. The method of claim 17, wherein the two different elevations are spaced apart by at least about 4.0 inches in a vertical direction.

* * * * *